United States Patent [19]

Hori

[11] 4,149,438
[45] Apr. 17, 1979

[54] PRESS CUTTING APPARATUS

[76] Inventor: Shinichi Hori, c/o Asada Machinery Mfg. Co. Ltd. 30-35, 1 chome, Ohamacho, Amagasaki City, Hyogo Prefecture, Japan

[21] Appl. No.: 821,228

[22] Filed: Aug. 2, 1977

[30] Foreign Application Priority Data

Aug. 3, 1976 [JP] Japan .................. 51-104228

[51] Int. Cl.² ........................... B26D 1/56
[52] U.S. Cl. ........................... 83/319; 83/169; 83/294; 83/320
[58] Field of Search ............ 83/294, 295, 319, 320, 83/322, 323, 327, 328, 169

[56] References Cited

U.S. PATENT DOCUMENTS

| | | | |
|---|---|---|---|
| 1,360,972 | 11/1920 | Napier | 83/169 |
| 1,471,669 | 10/1923 | Miller | 83/169 X |
| 2,112,850 | 4/1938 | Klingler et al. | 83/320 X |
| 2,582,025 | 1/1952 | Frank et al. | 83/294 X |
| 2,678,097 | 5/1954 | Hahn et al. | 83/294 X |
| 2,808,104 | 10/1957 | Peterson | 83/320 |
| 3,111,054 | 11/1963 | Tishken | 83/320 |
| 3,244,048 | 4/1966 | Salger | 83/320 X |
| 3,327,578 | 6/1967 | Hullden | 83/320 X |
| 4,027,564 | 6/1977 | Yahara | 83/328 |

Primary Examiner—Frank T. Yost
Attorney, Agent, or Firm—Gabriel P. Katona

[57] ABSTRACT

Apparatus for transversely press cutting into suitable lengths a shaped, elongated bar-like workpiece, product or section of steel which is being fed in continuously. The apparatus comprises a crank mechanism driven by a single, multi-function drive source and is adapted to perform the functions of four devices simultaneously, in a timed relation, namely a device for reciprocating a cutter in the direction of travel of the product or section, a device for advancing and retracting the cutter relative to the section, a device for driving a die opposed to the cutter, and a device for driving a clamp which holds the section during the cutting operation.

7 Claims, 7 Drawing Figures

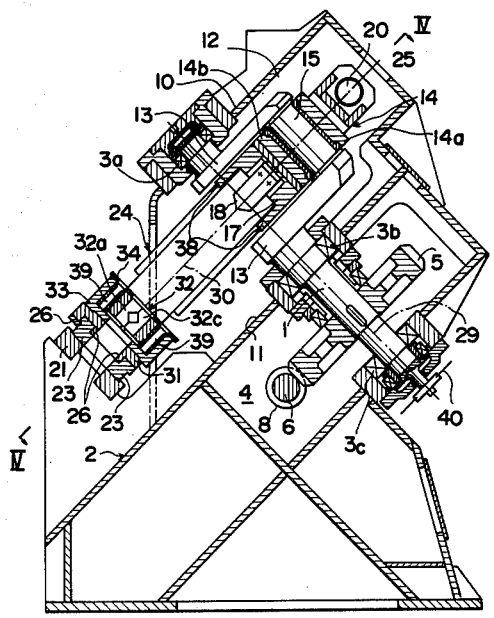

PRESS CUTTING APPARATUS

The present invention relates to an apparatus for transversely press cutting an extruded or drawn section or workpiece made of steel which is being fed continuously to the apparatus (hereinafter referred to mainly as a "section") into suitable lengths as the worker moves the section.

Generally, a section press cutting apparatus comprises a cutter and a die mechanism associated therewith, the former being disposed above the latter with the linearly moving section being passed therebetween, and a clamp mechanism, the arrangement being such that the clamp holds the section during cutting while the cutter and the die are moved at the same speed and in the same direction as the section, which the cutter and the die are moved back, to be ready for the next cutting operation.

To this end, it is necessary to provide the apparatus with drive means for reciprocating the cutter in the direction of travel of the section, a reversing mechanism for changing the direction of travel, and a drive mechanism for advancing and retracting the cutter relative to the section.

Furthermore, it is necessary to provide separate drive means for controlling the reciprocating motion of the die. Thus the drawback is that the apparatus is very complicated in construction and large in size, and that a plurality of drive means are required.

As contrasted therewith, the present invention is characterized in that a cutter is rotated in the same direction at all times by a crank mechanism, thereby enabling the same mechanism to provide a reciprocating motion for the cutter, in the direction of travel of the section or workpiece, and an advancing and retracting motion for the cutter relative to the section. A slide assembly is provided with is reciprocated by the crank mechanism transversely, in a timed relation, to the cutter and the die that are mounted on the slide assembly.

Therefore, the principal object of the present invention is to provide a press cutting apparatus which is driven by a single, multi-function drive and which makes it unnecessary to individually provide cutter reciprocating means, cutter advancing and retracting means, and die reciprocating means.

Further, in the conventional press cutting apparatus, since the rate of downward movement of the cutter, as it descends to cut the section or workpiece, is substantially constant throughout the travel, the percussive pressure exerted on the cutter upon contact with the section is high enough to wear out the cutter in a short time, necessitating frequent replacement thereof.

As contrasted therewith, according to the invention, in converting the rotative motion of the drive shaft into a linear motion for the cutter, the rotative speed of the drive shaft is controlled so that the rate of downward movement of the cutter is sharply decreased as it approaches the section, thereby minimizing the percussive pressure exerted on the cutter upon contact with the section.

Accordingly, a second object of the invention is to minimize the wear of the cutter, thereby enabling the cutter to withstand a prolonged period of use.

Further, it is known that when the cutter cuts the section or workpiece, shearing heat is produced, accelerating the wear of the cutter. In order to avoid this, it is preferable to feed cooling water or lubricating oil directly to the cutter, just prior to each cutting operation. In this type of press cutting apparatus, however, since the cutter is generally located just above the die that holds the section, there has been the danger of lubricating oil being fed to the cutter, dripping on the section directly thereunder, soiling the section and greatly detracting from the value of the end product. Conventionally, the cutter must therefore be used in an oilless condition, resulting in the drawback of further acceleration of the cutter wear.

Accordingly, a third object of the invention is to provide an arrangement wherein the cutter and the die mechanism opposed thereto are installed on a slope, preferably at an angle of 45° with respect to the horizontal, and the cutter is disposed above an inclined lubricating-oil recovery guide plate rather than just above the die, to assure that the oil fed to the cutter drips directly on the guide plate, thereby enabling the cutting operation to be carried out while feeding oil to the cutter, as before, whereby the wear of the cutter is further decreased.

The invention will be described hereafter in full detail, with reference to the accompanying drawings, explaining the important objects, features and advantages of the invention, as embodied in an exemplary press cutting apparatus. In the drawings, FIG. 1 is a schematic illustration of the principle of the present invention;

Figure 1:
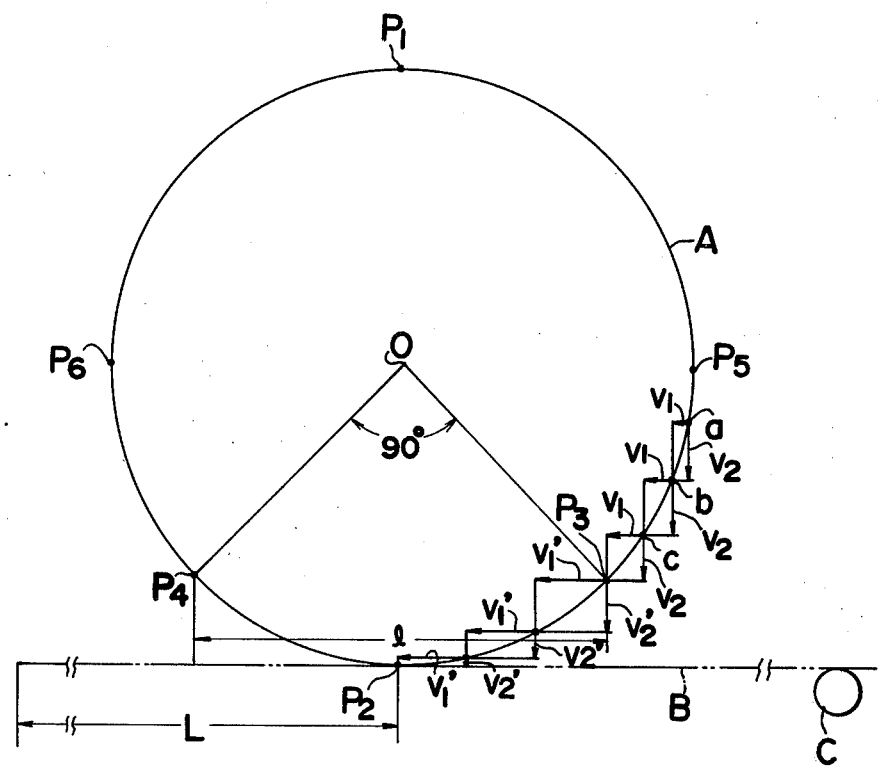
Figure 2:
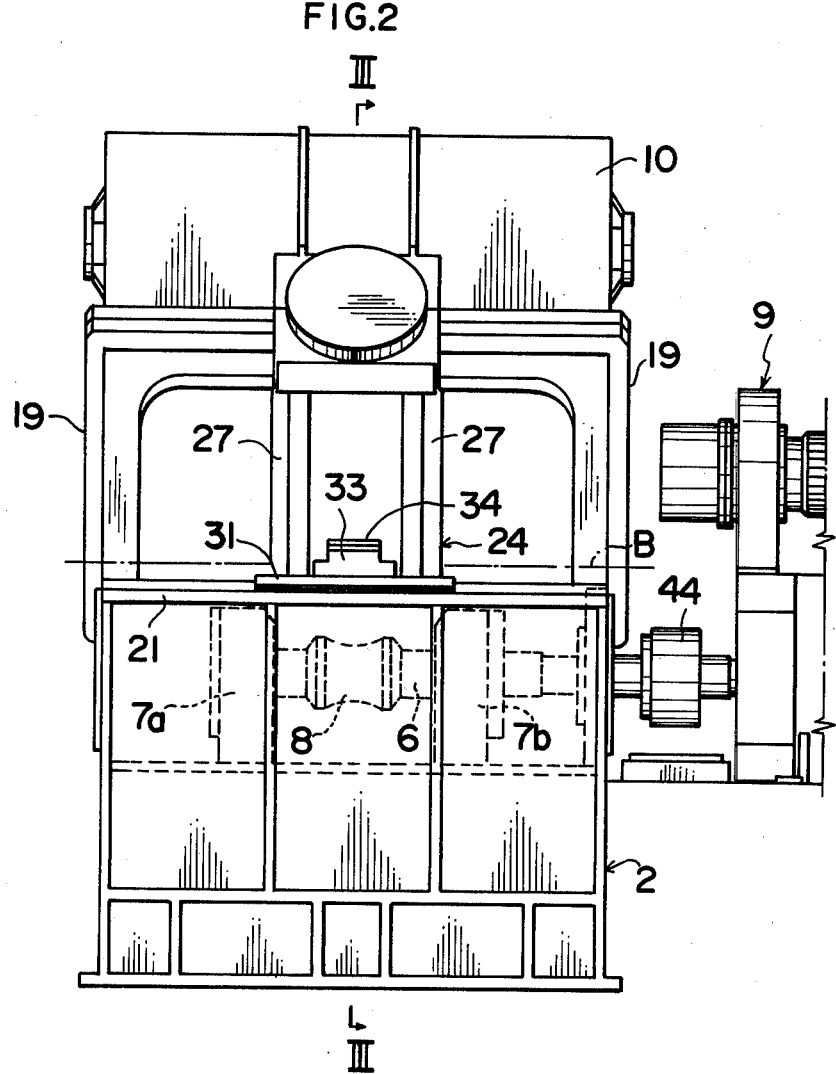
FIG. 2 is a front view of an exemplary embodiment of a press cutting apparatus according to the invention.

First the principle of a press cutting apparatus will be described to facilitate the understanding of the invention. In FIG. 1, the character A designates the path of a cutter which is rotated by a crankshaft, with the center of rotation at a point O, and which has upper and lower dead points P1 and P2. In the disclosed, exemplary apparatus embodiment, the path is taken as the path of rotation of a crank pin. All these structural parts of the apparatus will be described later in more detail. Designated at B is a section or workpiece to be cut, and the same is fed in by a feed roll C, tangentially to the path of rotation A, passing through the lower dead point P2. The cutter is in a stopped condition at the upper dead point P1, and it is from this condition that the section B is conveyed by the roll C.

The amount of the section fed is derived from the rpm of the feed roll C since it is proportional thereto. The arrangement is such that when that amount reaches a certain value, the cutter begins to be rotated, and when the cutter reaches the lower dead point P2, the section B is cut. By repetition of this operation, the section B is successively cut into lengths, each measuring L.

The point of time at which the cutter begins to be rotated is derived from the correlation between the rate of conveyance of the section (the rotative speed of the feed roll C), the rotative speed of the cutter (that of the crankshaft) and the cut length L. On the other hand, the amount of rotation of the feed roll C (the amount of the section fed) is detected for example by producing a pulse per revolution of the feed roll C.

Since the cutter is rotated by the crankshaft, if the angular velocity of the cutter is made constant, the amount of horizontal travel thereof continually changes. For example, when horizontal and vertical velocity components or vectors V1, V2 of the cutter are considered, respectively, at three points a, b and c on the path of rotation A of the cutter, it is seen that the horizontal velocity component V1 increases as it approaches the lower dead point P2. Further, the horizontal velocity of the cutter at the lower dead point P2 must be equal to the feed rate of the section B in order to enable the section to be cut. Therefore, the angular velocity of the cutter must be based on the feed rate of the section.

However, in order to ensure satisfactory cutting of the section or workpiece, it is necessary to use a clamping device to clamp the section B. Therefore, for the duration 1 of the section B being clamped, the clamping device must be moved in the direction of feed of the section, and at the same speed as the section.

In the invention, since the clamping device is driven in a timed relation to the rotation of the cutter, as will be understood from a description to be given later, the speed of the clamping device also changes with the passage of time. This does not influence the cutting of the section when the clamping duration 1 is relatively short (i.e., when the section is clamped substantially at the same time as the same is cut) or when the radius of the cutter is small.

However, when the clamping duration 1 is relatively long, it is desirable that there be no difference in the speed of the cutter, the clamping device and the section or workpiece B. This may be achieved by controlling the feed rate of the section, which is driven by the roll C, by adjusting it to the horizontal velocity component V1 of the cutter, or by controlling the angular velocity of the cutter relative to the feed rate of the section.

The present invention is characterized in that, with the section or workpiece B being fed at a uniform speed, and with the clamping duration 1 corresponding to the 90° rotative-angle range of the cutter, the angular velocity of the cutter is controlled so that its horizontal velocity component V'1 maintains its value at all points in the 90° range between points P3 and P4.

A preferred example of the invention, based on the just described principle, will now be described with reference to FIGS. 2 to 6b. A crankshaft 1 is angularly supported for rotation only, in bearings 3a, 3b on a machine frame 2, preferably at an angle of 45° with respect to the horizontal. It will be understood by those skilled in the art that the apparatus is assumed to operate best in a practically horizontal position, to which reference is being had in this application, although the absolute "horizontal" as such is not considered to be an indispensable pre-requisite. One end of the crankshaft 1 extends through an oil tank 4 in which a worm wheel 5 is secured to the crankshaft. In the tank 4, a rotatable shaft 6 is horizontally mounted in support blocks 7a, 7b, and has a worm 8 formed thereon which meshes with the wheel 5, the other end of the shaft 6 being connected through a coupling 44 to a drive unit or mechanism 9 installed outside the apparatus.

The drive unit 9 preferably consists of a motor, a speed reducing mechanism and an electric control mechanism, and it transmits power to the crankshaft 1 via the shaft 6 and a power transmission mechanism constituted by the worm 8 and the wheel 5.

In a space 12 defined between a front plate 10 and an inclined wall or guide plate 11 of the frame 2, a slider 14 is mounted for rotation on a crank pin 15 between a pair of opposed crank arms 13 of the crankshaft 1.

Figure 4:
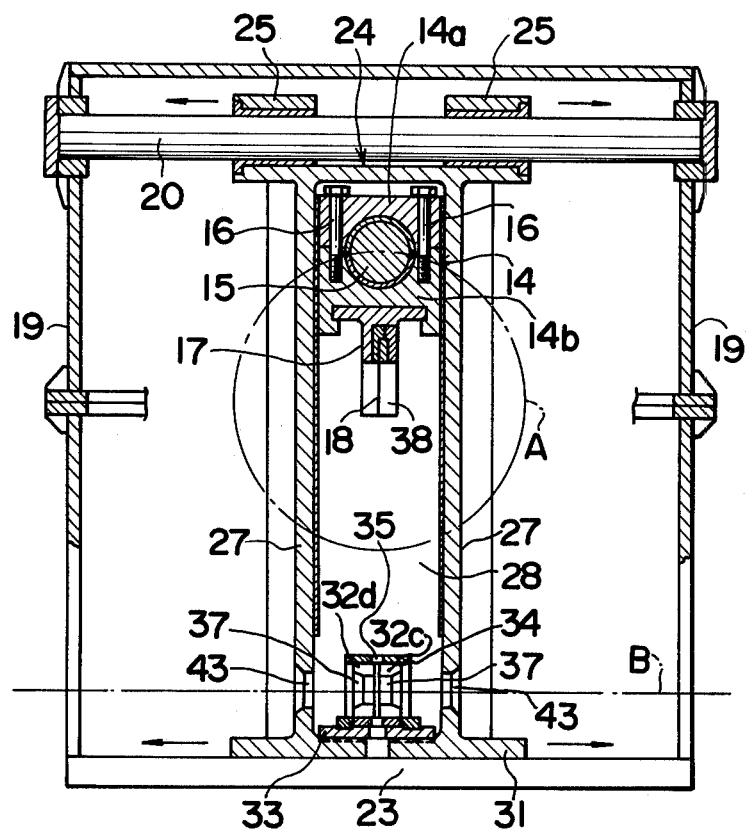
FIG. 4 is a frontal view, also in a longitudinal direction, taken along the line IV—IV of FIG. 3.
Figure 5:
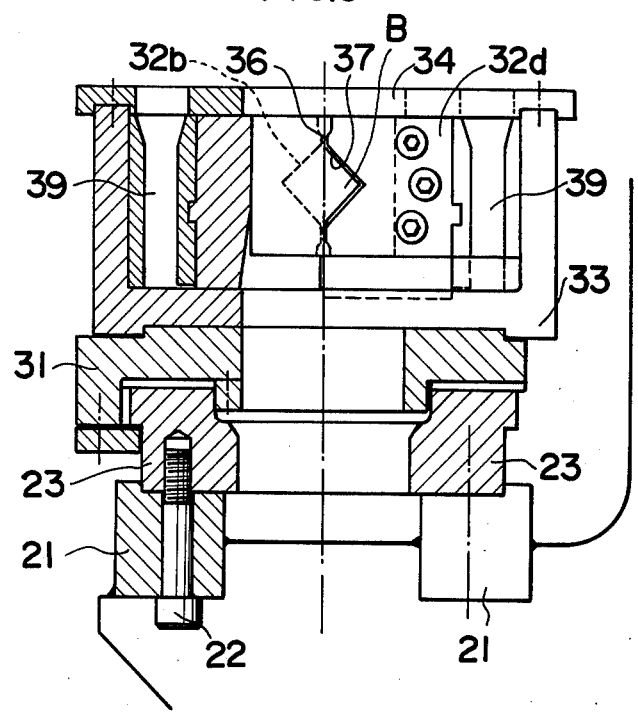
FIG. 5 is a view partly in section, showing a workpiece section-clamping part according to the invention.
Figure 6:
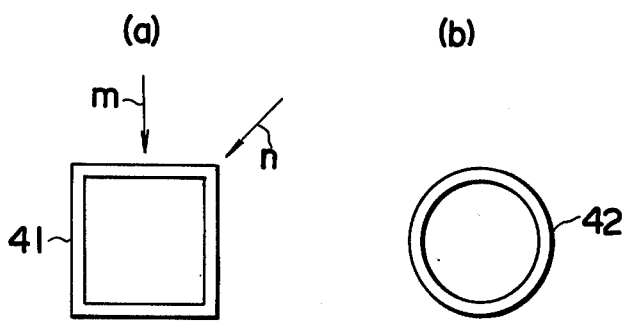
FIGS. 6a and 6b are sectional views of different sections or workpieces.

As shown in FIG. 4, the slider 14 is divided into upper and lower members 14a, 14b so that it can be mounted on the pin 15 by assembling them with bolt members 16. The slider has a cutter mount 17 removably attached to its lower surface. Numeral 18 designates a cutter. Horizontally mounted, immediately above the crank pin, within the space 12, is a guide shaft 20 extending between opposed partition walls 19, while a support block 21 is provided in the lower region of the space 12, and a rail block 23 is fixed on the block 21 by bolt members 22 and the like. The block 23 extends in the feed direction of the section or workpiece.

The shaft 20 and the block 23 cooperate to hold a slide assembly 24. This is held at its upper portion by sleeves 25 fitted on the shaft 20 and at its lower portion by dogs 26 engaged with the block or member 23. Further, the slide assembly 24 includes guide frames 27 which constitute the main body thereof, spaced apart a distance corresponding to the width of the slider 14, the frames 27 defining a guide slot 28 therebetween in which the slider 14 is fitted.

As a result, the rotation of the crankshaft 1 causes the rotation of the pin 15, describing the rotary path A shown in FIGS. 1 and 4 so that the horizontal velocity component V1 is imparted to the slide assembly 24 at any point on the rotary path through the slider 14, moving the assembly 24 laterally, while the slider 14 is rotated along the path A as it follows the crank pin 15.

In addition, the angular velocity of the pin 15 is controlled so that the horizontal velocity component V1 thereof is maintained constant in the 90° rotative-angle range corresponding to the clamping duration 1, as already described, and this is achieved by the electric control mechanism included in the drive unit, controlling the motor on the basis of a data signal programmed in advance in the electric control mechanism.

Therefore, the slide assembly 24 is also moved at a uniform speed, i.e., at the same speed as the feed rate of the section or workpiece. As a result, as is apparent from FIG. 1, as the cutter 18 approaches the cutting completion point P2 from point P3, a vertical velocity component V'2 of the cutter 18 sharply decreases, minimizing the shock or percussive pressure exerted on the section B of upon cutting. Thus it provides a kind of buffer action, lessening wear on the cutter 18.

The slide block 24 is positioned in the direction of an axis 30, perpendicularly intersecting the axis 29 of the crankshaft 1, and hence it is inclined at an angle of 45° with respect to the horizontal plane. Similarly, the block 23 is positioned on a 45° inclined plane, perpendicularly intersecting the axis 30. From this it follows that the slider 14 is moved away from and toward the block 23 in the direction of the axis 30. This arrangement prevents the lubricating oil which is being fed to the cutter 18 from dripping on a die (32, to be described in more detail as the description proceeds), and hence the oil will trickle down the inclined guide plate 11 and can eventually be recovered. In this way cutting can be carried out while applying lubricating oil to the cutter, further decreasing the wear thereof.

Dies 32 (that is, die members 32a . . . 32d), associated with the cutter 18 for cutting the section or workpiece, are installed on a lower frame 31 of the slide assembly 24. As is apparent from FIGS. 3 through 5, a die mount 33 is installed on the lower frame 31, and the dies 32a . . . 32d are installed inside the mount 33, with a lid 34 fixed to the mount 33 for retaining the dies. Between the dies 32a, 32b and 32c, 32d, which are arranged in the direction of feed of the section, there are defined clearances 35 for receiving the cutter 18 therein, while between the dies 32a, 32c and 32b, 32d, which are arranged transversely of that direction, there are defined small clearances 36. The purpose of these clearances is to assure that the section B passing through holes 37 of the dies 32a . . . 32d will not rub against the dies, the clearances 36 being maintained by a suitable spring member. Corresponding holes 43 are axially provided in the guide frames 27 (see FIG. 4).

As for the slider 14, clamp members 38 are dependent from the cutter mount 17, with the cutter 18 interposed therebetween, the arrangement being such that when the cutter 18 reaches point P3 in FIG. 1 during the rotation of the crank pin 15, the clamp member 38 enter clearances 39 defined between the dies 32a, 32b and the die mount 33, and between the dies 32c, 32d and the die mount 33, thereby thrusting the dies 32a, 32c and 32b, 32d toward each other to clamp the section B passing through the die holes 37.

Figure 3:
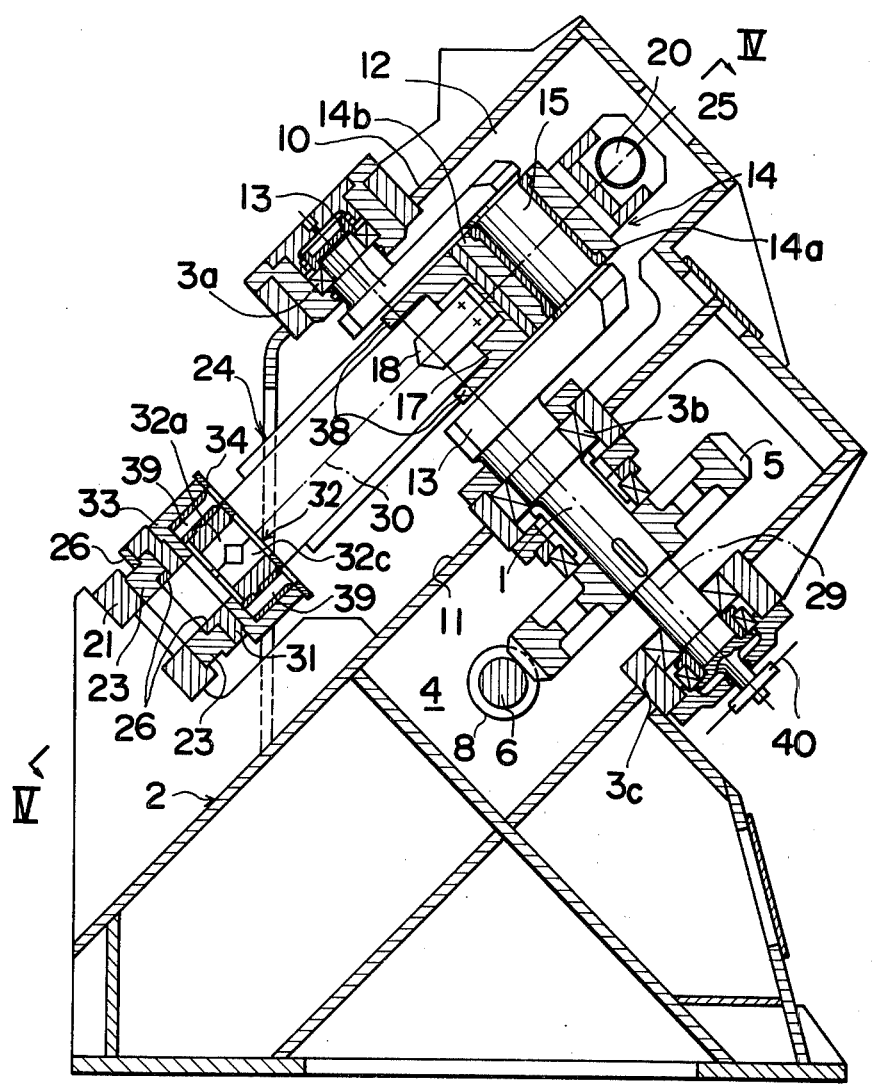
FIG. 3 is a sectional view in a longitudinal direction, taken along the line III—III of FIG. 2.

Designated at 40 in FIG. 3 is a sensor for detecting the amount of rotation of the crankshaft 1. The sensor is adapted to give a stop signal to the drive unit 9 when the crank pin 15 returns to the upper dead point P1 as a result of the crankshaft 1 making one complete revolution.

The reason why the cutter 18 is arranged in this embodiment to approach the section B in a 45° angular direction (the same direction as the axis 30) is that this allows lubricating oil to be fed to the cutter 18 without soiling the section or workpiece, as described above, and that, if the section B is a square pipe 41 as shown in FIG. 6a, cutting with the cutter 18 being applied to a side thereof in the direction of an arrow m, would result in the buckling of the square pipe, whereas in the described arrangement cutting is effected with the cutter applied to a corner of the pipe, obliquely, in the direction of an arrow n. In addition, it goes without saying that a round pipe 42 as shown in FIG. 6b can be cut without any difficulty.

The cutting operation will now be described with reference to FIG. 1 that illustrates the principle of the invention. The crank pin 15 and the slider 14 are brought to a stop at the upper dead point P1 in FIG. 1, whereupon the section or workpiece B being fed into the holes 37 of the dies 32a . . . 32d through openings 43 in the guide frames 27 in a horizontal linear direction which is tangent to the lower dead point P2. For the sake of completeness it might be added here that part 44, a coupling, was mentioned earlier, in connection with the structure between the shaft 6 and the drive unit 9.

As previously described, when the amount of the section B that was fed in reaches a certain value, a signal is given to the drive unit 9 to rotate the motor, and the torque from the motor is transmitted to the crankshaft 1 through the power transmission mechanism constituted by the worm 3 and the wheel 5, whereby the shaft 1 is rotated. As a result, during one complete revolution of the shaft 1, the pin 15 and the slider 14 cause the assembly 24 to slide in the direction opposite to the direction of feed of the section in the 90° rotative-angle range, from point P1 to point P5 in FIG. 1, then in the direction of feed of the section in the subsequent 180° range, from point P5 to point P6, and finally in the opposite direction in the subsequent 90 range, from point P6 back to point P1.

In the meanwhile, at point P3 the cutter 18 starts being inserted into the clearances 35, and simultaneously therewith the clamp members 38 begin to be inserted into the clearances 39, thrusting the dies 32a, 32b and 32c, 32d toward each other until they closely contact each other, whereby the section or workpiece passing through the die holes 37 is clamped, this clamped condition being maintained in the 90° rotative-angle range from point P3 to point P4.

During the travel from point P3 to point P2, the clamping action by the members 38 and the dies 32a . . . 32d becomes even stronger while the penetration of the cutter 18 into the clearances 35 becomes deeper, initiating the cutting of the section B, which is completed at the lower dead point P2.

During the travel from point P2 to point P4, inversely, the clamp members 38 and the cutter 18 are retracted from the dies 32a . . . 32d and from the section. When the crankshaft 1 makes one complete revolution to bring the pin 15 and the slider 14 to the upper dead point P1, the sensor 40 detects their arrival at that point and emits the stop signal to the drive unit 9, stopping the rotation of the crankshaft 1, so that the crank pin 15 and the slider 14 are stopped at the upper dead point P1, to be ready for the next cutting operation.

It will be understood by those skilled in the art that various modifications of, additions to and changes in the disclosed particulars are possible, without departing from the spirit and scope of the invention, and these are considered to fall within the scope of the present invention.

What I claim is:

1. An apparatus for transversely press cutting shaped, elongated bar-like workpieces (b) of steel into predetermined, identical lengths, comprising, in combination: a crank mechanism (1, 13, 15) driven by a single, multifunction drive means (9) to perform simultaneous functions in a timed relation, namely those of: first, means (24, 27) including slide portions, for reciprocating a rotatable cutter (18) in the direction of travel of the workpieces to be cut; said slide portions being held by substantially horizontally movable sleeve members (25); an inclined lubricating-oil recovery guide plate (11) installed directly under said cutter; second, means (14) for advancing and retracting said cutter relative to sections made from the workpieces by said cutter; said reciprocating means including a pair of frames (27) that define a guide slot (28); said advancing means including a slider (14) movable in said guide slot, with a removable mount (17) for said cutter, and being constituted by two cooperating members (14a, 14b) that are releasably attachable by the aid of at least one bolt member (16) to a rotatable crank pin (15) that forms part of said crank mechanism; and, third, means (38) for driving die means (32 . . .) that are opposed to said cutter; said crank mechanism further including a crank shaft (1), the latter being provided with a sensor (40) for giving a stop signal to said drive means when said crank pin is positioned at its upper dead point (P1) during its rotation; said die means including means for driving a clamp mechanism (38) which holds the sections during the cutting, wherein said crank mechanism, said cutter and said clamp mechanism are moved up and down along said guide frames;

and said die means, which are also opposed to said clamp mechanism, are disposed at an angle with respect to the horizontal.

2. The press cutting apparatus as defined in claim 1, wherein said crank pin (15) has a rotative-angle range with a lower dead point (P2) of said crank pin included therein; the clamping duration (1) of said die means (32 ...) being insured by clamp members (38) that form part of said clamp mechanism; and wherein the point of time at which the cutting of the workpieces (B) by said cutter (18) is completed, is set at the lower dead point.

3. The press cutting apparatus as defined in claim 2, wherein the horizontal velocity component (V'1) of said cutter (18) is constant during the clamping duration (1).

4. The press cutting apparatus as defined in claim 1, further comprising: horizontally juxtaposed guide members (20, 23) for guiding said slide portions (24); said guide slot (28) being in said slide portions to selectively advance and retract said cutter (18) and said clamp mechanism (38); and wherein the functions of said drive means (9) also include: moving said slide portions substantially horizontaly, linearly in a first direction; reciprocating a portion (14) of said advancing means also linearly in a second direction that is perpendicular to the first direction; and wherein said die (32 ...) driving means reciprocate in a linear direction along with said slide portions.

5. The press cutting apparatus as defined in claim 1, wherein the angle with respect to the horizontal is approximately 45 degrees.

6. The press cutting apparatus as defined in claim 1, wherein said die means (32 ...) consist of at least four die members 32a ... 32d) installed on a die mount (33), movable toward each other, and having holes (37) for receiving the material (B) to be cut being fed in.

7. The press cutting apparatus as defined in claim 6, wherein clamp-member (38) receiving clearances (32) are provided between said die members (32a ... 32d) and said die mount (33), for urging said die members against each other.

* * * * *